United States Patent [19]

Larson

[11] Patent Number: 4,480,085

[45] Date of Patent: Oct. 30, 1984

[54] AMORPHOUS SULFOPOLYESTERS

[75] Inventor: Wayne K. Larson, Maplewood, Minn.

[73] Assignee: Minnesota Mining and Manufacturing Company, St. Paul, Minn.

[21] Appl. No.: 537,829

[22] Filed: Sep. 30, 1983

[51] Int. Cl.$^3$ .................. C08G 63/68; C08G 75/00
[52] U.S. Cl. ................................. 528/295; 528/272
[58] Field of Search ................. 528/295, 272, 302

[56] References Cited

U.S. PATENT DOCUMENTS 3,779,993 12/1973 Kibler et al. .................. 528/295
4,101,274 7/1978 Beutler et al. ............... 528/272 X

*Primary Examiner*—Lucille M. Phynes
*Attorney, Agent, or Firm*—Donald M. Sell; James A. Smith; Gerald F. Chernivec

[57] ABSTRACT

Amorphous sulfopolyesters which are the esterification product of glycols and dicarboxylic acids and, optionally, hydroxycarboxylic acids, of which at least about 35 mole percent are ortho-dicarboxylic acids.

5 Claims, No Drawings

AMORPHOUS SULFOPOLYESTERS

TECHNICAL FIELD

This invention relates to water-soluble and/or organic solvent soluble film-forming polyesters. The invention particularly relates to film-forming, amorphous polyesters which are substituted by sulfo groups.

BACKGROUND ART

Polyesters which are made to contain units derived from a sulfodicarboxylic acid are well known, primarily for their use in fibers that can be readily dyed by basic dyes. Such polyesters are typically highly crystalline and also do not contain a sufficient number of units derived from a sulfodicarboxylic acid to be water soluble.

Polyesters that contain a sufficient number of units derived from a sulfodicarboxylic acid to make the polyester water soluble, water dispersible, water dispellable, or water dissipatable are also known. U.S. Pat. Nos. 4,052,368, 4,300,580, and 4,304,901, for example, disclose polyesters rresulting from the reaction of aromatic dicarboxylic acids and/or aromatic dicarboxylic acids having a sulfonate group, with aliphatic diols. All of the examples of these patents illustrate the preparation or use of polyesters that, although water-soluble or dispersible, are crystalline or which would crystallize on subjecting the polyester to annealing conditions. Of the three patents cited above, U.S. Pat. Nos. 4,052,368 and 4,300,580 list aromatic dicarboxylic acids which can be used to prepare water-soluble or water-dispellable polyesters, and include in the list o-phthalic acid. They do not disclose the attainment of an amorphous product, however. It is my belief that neither of the above-cited patents, nor any other art of which I am aware, disclose film-forming, water-soluble polyesters that are amorphous and noncrystallizable even when maintained under annealing conditions.

SUMMARY OF THE INVENTION

In accordance with the invention there is provided a film-forming, amorphous, non-crystallizable sulfopolyester. The sulfopolyester is a polyester of dicarboxylic acids (including the corresponding acid halides, anhydrides and esters with alcohols having boiling points below 200° C. at 1 Torr) and diols (including the corresponding esters of the diols with carboxylic acids having boiling points below 200° C. at 1 Torr) and, optionally, monohydroxycarboxylic acids (including the corresponding diesters with alcohols and carboxylic acids boiling below 200° C. at 1 Torr).

The dicarboxylic acids and hydroxycarboxylic acids are organic acids of which at least about 35 mole percent are ortho- or peri-arylene dicarboxylic acids in which the arylene group has 6 to 14 carbon atoms. The remaining up to about 65 mole percent of organic acids are dicarboxylic acids in which the organic group is not an ortho- or peri-arylenè group, and therefore is a meta- or para-arylene or alkarylene group having 6 to 14 carbon atoms; or are organic dicarboxylic or hydroxycarboxylic acid in which the organic group is a saturated straight chain, branched chain, or 4- to 6-membered ring cyclic aliphatic group having 2 to 10 carbon atoms and, optionally, caternary oxygen atoms.

The diols utilized herein are organic diols in which the organic group is a straight chain, branched chain, or 4- or 6-membered ring aliphatic group having 2 to 10 carbon atoms and, optionally, one to four caternary oxygen atoms, of which no two oxygen atoms are adjacent or attached to the same carbon atom.

The dicarboxylic acids, diols, and hydroxycarboxylic acids may be substituted by one or more groups which do not interfere, (i.e., coreact) in an esterification reaction, as for example, lower alkyl and lower alkoxy groups having 1 to 4 carbon atoms, chlorine, fluorine, nitro, cyano, and sulfo groups.

Furthermore, from 1 to 15 mole percent of the total moles of dicarboxylic acids, glycols, and hydroxycarboxylic acids must be substituted by a sulfo group.

There are also provided solutions, preferably aqueous solutions, of the sulfopolyester as well as substrates bearing a layer of the sulfopolyester.

DETAILED DESCRIPTION OF THE INVENTION

The present invention provides a polyester, specifically a sulfopolyester, which is useful to prepare water and solvent soluble coatings, films, binders, and adhesives that can be applied from solution, particularly aqueous solution. The sulfopolyester of the invention is amorphous and noncrystallizable and therefore desirable because it does not crystallize even on prolonged storage. The properties of resultant coatings, films and adhesives prepared using the sulfopolyester, therefore, do not change on aging because the sulfopolyester does not crystallize. Also, solutions of the polyester are stable and do not become cloudy or exhibit phase separation on prolonged storage.

The term "amorphous and non-crystallizable", in the context of this invention, means that the sulfopolyester of the invention, fails to exhibit crystalline regions either when freshly prepared or after having been subjected to annealing conditions for prolonged periods of time, e.g., after a sample of the sulfopolyester has been held at a temperature of about its glass transition temperature (50° C. to 150° C.) for from two to ten days. Techniques for examining this phenomenon include thermal techniques, i.e., differential scanning colorimetry, and conventional x-ray techniques.

The sulfopolyester of the invention preferably has a weight average molecular weight of from about 8,000 to about 50,000 and repeating units of the formula

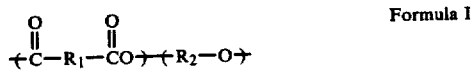

Formula I with, optionally, up to 30 weight percent of units having the formula

Formula II wherein
$R_1$ is one or more divalent organic groups selected from $-R_2-$, $-R_3-$, and $-R_4-$ groups in which
$R_3$ are ortho- and peri-arylene groups having 6 to 14 carbon atoms;
$R_4$ are meta- and para-arylene groups having 6 to 14 carbon atoms; and
$R_2$ and $R_5$ are the same or different divalent aliphatic group that is a straight chain, a branched chain having 2 to 10 carbon atoms and, optionally, one to four caternary oxygen atoms of which no two are attached together or to the same carbon atom, or a ring of 4 to 6 carbon atoms or 3 to 6 carbon atoms and one oxygen; with the provisos that the mole percentage of $R_3$ is at least about 35 percent of the total moles of $R_1$ and $R_5$ and that per 100 moles of combined $R_1$, $R_2$, and $R_5$ there are present 1 to 15 moles of attached $-SO_3M$ groups in which M is a cation.

The most preferred sulfopolyester of the invention has the formula

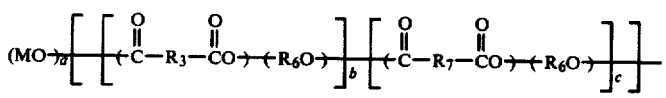 Formula III in which $R_3$ is as defined above;

$R_6$ is a straight chain alkylene group having 2 to 6 carbon atoms;

$R_7$ is a 5-sulfo-m-phenylene group;

a is 0, 1, or 2;

b is a number having a value from about 5 to about 15; and the ratio of b to c is from about 10 to about 15 to 1; and M is an alkali metal, e.g., sodium, potassium, or lithium.

The amorphous, non-crystallizable sulfopolyester of the invention can be prepared by a process of:

(1) Preparing an esterification mixture of essentially equivalent amounts of organic dicarboxylic acids having the formula:

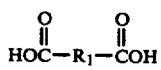 Formula IV or the corresponding acid halide, anhydride or ester with an alcohol boiling below 200° C. at 1.0 Torr, and diols having the formula

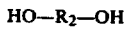 Formula V or their esters with a carboxylic acid boiling below 200° C. at 1 Torr and, optionally, organic hydroxycarboxylic acids having the formula

 Formula VI or the corresponding esters with an alcohol and carboxylic acid having a boiling point below 200° C. at 1 Torr, in which $R_1$, $R_2$, and $R_5$ are as defined above and at least 35 mole percent of combined moles of dicarboxylic acids and hydroxycarboxylic acids are ortho or peri-arylene dicarboxylic acids; and (2) Heating the mixture at 150° to 300° C. for from 2 to 20 hours while removing volatiles to effect condensation of the —COH and —OH groups with formation of

groups and thus joining the organic groups $R_1$ and $R_2$ and, optionally, $R_5$ into a polyester having a preferred weight average molecular weight of from about 8,000 to about 50,000.

Preferably, the process is carried out in the presence of a condensation catalyst, e.g., antimony trioxide. The esterification mixture may contain, per total moles of carboxylic acid, 10 to 25 milliquivalents (meq) of an ionizable alkali metal compound in which the anion has an ionization constant, $pK_a$ ($-\log K$), of preferably greater than about 4.0. Examples of such salts are sodium acetate, potassium acetate, lithium acetate, sodium bicarbonate, sodium carbonate, potassium carbonate, sodium hydroxide, and potassium hydroxide.

The desired resultant amorphous, non-crystallizable characteristics of the sulfopolyester are believed to be due to the fact that at least about 35 mole percent of the acids therein (including both dicarboxylic acids and hydroxycarboxylic acids) are organic acids in which the carboxyl groups are an ortho- or peri-arylene group.

Ortho- and peri-arylene dicarboxylic acids that can be used to make the sulfopolyester include all dicarboxylic acids having 6 to 14 carbon atoms and carboxyl groups on adjacent or peri- positioned carbon atoms. The dicarboxylic acids can be substituted by groups having a molecular weight of less than about 80 and are inert in an esterification reaction, such as the halogens, cyano, nitro, lower alkyl and alkoxy groups having 1 to 4 carbon atoms, and phenyl groups. Examples of ortho- and peri-aliphatic dicarboxylic acids include o-phthalic acid, 3-methylphthalic acid, 3,4-dimethylphthalic acid, 4,5-dimethylphthalic acid, 3,6-dimethylphthalic acid, 4-butylphthalic acid, 4-chlorphthalic acid, 4-ethoxyphthalic acid, 4-cyanophthalic acid, 1,9-naphthalenedicarboxylic acid, 1,2-naphthalenedicarboxylic acid, 2,3-naphthalenedicarboxylic acid, 1,10-anthracenedicarboxylic acid and 1,2-anthracenedicarboxylic acid. The corresponding acid halides, particularly the acid chlorides, esters with lower alcohols, and anhydrides can also be used.

Examples of dicarboxylic acids not having ortho- or peri-positioned carboxylic groups having utility include isophthalic acid, terephthalic acid, 5-methylisophthalic acid, 5-phenylisophthalic acid, 1,3-naphthalenedicarboxylic acid, 1,4-naphthalenedicarboxylic acid, 1,5-naphthalenedicarboxylic acid, 1,6-anthracenedicarboxylic acid, succinic acid, adipic acid, glutamic acid, tetradecanedicarboxylic acid, 2,3-dimethyl-1,4-butanedicarboxylic acid, 4-oxoheptanedicarboxylic acid, 4,7-dioxodecanedicarboxylic acid, 4,7,10,13-tetraoxohexadecanedicarboxylic acid, 1,3-cyclopentanedicarboxylic acid, 1,4-cyclohexanedicarboxylic acid, 1,4-cyclohexanediacetic acid, and their corresponding acid halides and esters with low molecular weight alcohols.

Examples of diols of Formula V that can be used include ethylene glycol, 1,3-propanediol, 1,4-butanediol, 2,2-dimethylolpropane, 1,4-dihydroxy-2,3-dimethylbutane, 1,6-hexanediol, 1,10-decanediol, 1,4-cyclohexanediol, 1,4-dimethylolcyclohexane, and 3,3,5-trimethyl-5-hydroxymethylcyclohexanol and their esters with low molecular weight carboxylic acids such as 1,2-ethylene diacetate and 1,3-trimethylene dipropionate.

In addition to the monomeric diols described above, there can be used, based on total diols, up to about 10 mole percent of polymeric diols having a molecular weight of up to about 1000. Examples of such polymeric diols are the polyoxyalkylenediols, such as the polyoxyethylenediols and the polyoxypropylenediols, and the polycaprolactonediols.

Hydroxycarboxylic acids of Formula VI having utility herein are any of the aliphatic hydroxycarboxylic acids having 2 to 10 carbon atoms and, optionally, up to four caternary oxygen atoms. Examples of such hydroxycarboxylic acids include 3-hydroxypropionic acid, 4-hydroxybutyric acid, 10-hydroxydecanioc acid, 4-hydroxycyclohexanecarboxylic acid, 3-(4-hydroxyphenyl)propionic acid (phloretic acid) and their diesters with low molecular weight alcohols and carboxylic acids, such as ethyl 3-acetoxypropionate and ethyl 4-acetoxybutyrate.

Compounds of Formulae IV, V, and VI having a sulfo group include any sulfoarylene dicarboxylic acid in which the arylene group has 6 to 14 carbon atoms and any sulfoaliphatic diol and hydroxycarboxylic acid in which the aliphatic group is as defined by $R_2$ and $R_5$.

The term "sulfo", as used herein, is intended to embrace the group —$SO_3M$, in which M is a cation such as hydrogen; the alkali metal cations, such as sodium, potassium, and lithium; the alkaline earth metal cations, such as calcium and magnesium; and the ammonium cations, such as ammonium, methylammonium, dimethylammonium, triethylammonium, phenyldimethylammonium and phenyltrimethylammonium.

Examples of sulfoarylenedicarboxylic acids which have utility include 3-sulfophthalic acid, 4-sulfophthalic acid, 5-sulfophthalic acid, sulfoterephthalic acid, 5-sulfoisophthalic acid, 4-sulfonaphthalene-2,7dicarboxylic acid, 5-(4-sulfophenyl)-isophthalic acid, 5-(4-sulfophenoxy)isophthalic acid, and 5-(2-sulfoethyl)isophthalic acid.

Examples of sulfoaliphaticdicarboxylic acids include sulfosuccinic acid, 3-sulfoglutaric acid, and 3-(4-sulfophenyl)glutaric acid.

Examples of sulfoaliphatic hydroxycarboxylic acids which can be used include 3-hydroxy-2-sulfopropionic acid and 5-hydroxy-3-sulfopentanoic acid.

Examples of sulfoaliphatic diols which can be used include 2,3-dihydroxypropanesulfonic acid and 1,5-dihydroxypentane-3-sulfonic acid.

It is to be understood that the corresponding alkali metal, alkaline earth metal, and ammonium salts of the sulfodicarboxylic acids, diols and hydroxycarboxylic acids are to be included in the above lists of compounds, as well as the diesters such as dimethyl 5-sodiosulfoisophthalate, diethyl 5-trimethylammoniosulfoisophthalate, 2-acetoxy-4-lithiosulfobutyrate, and 2,3-diacetoxypropanesulfonic acid sodium salt.

The amorphous sulfopolyesters of the invention have particular utility as adhesives, removable coatings, e.g., textile and implement finishes, binders for photosensitive materials useful for photosensitive articles, and coatings for various substrates which can be applied from water or aqueous solution or from a low boiling organic solvent solution and which can be readily removed by a low boiling organic solvent or, in many cases, by water.

The amorphous sulfopolyesters may be blended with other substances to alter properties, such as hardness, tackiness, color, etc. Examples of such substances include viscosity modifiers, such as polyesters and polyoxyalkylene; antioxidants, such as butylated hydroxyanisole; lubricants; elasticizers; photosensitive materials such as ethylenically-unsaturated monomers and photosensitizers; inorganic thickeners; fillers, such as organic and inorganic particles, fibers, and flakes; pigments; and dyes. Fillers and viscosity modifiers, generally, can be added up to about two parts by weight per part by weight of sulfopolyester and the other adjuvants at from about 0.01 to about 10 percent by weight of total composition.

Objects and advantages of this invention are further illustrated by the following examples, but the particular materials and amounts thereof recited, as well as the conditions and details, should not be construed to be unduly limiting.

EXAMPLE 1

(Illustrating the preparation of a film-forming, low boiling solvent soluble, amorphous, non-crystallizable sulfopolyester).

Into a 500 ml 3-neck flask equipped with a stirrer, thermometer, reflux column, and means for maintaining an atmosphere of nitrogen over the contents of the flask were placed 178.5 g (0.92 mole) dimethyl phthalate, 23.7 g dimethyl 5-sodiosulfoisophthalate (0.08 mole), 124 g (2.0 moles) ethylene glycol, 0.1 g antimony trioxide, and 1.09 g sodium acetate (13.3 meq/mole of dicarboxylic acids). While stirring, the mixture was heated to 193° C. and held at this temperature for 4 hours. The reflux column was then replaced with a vacuum distillation head, a vacuum line was attached, and over a period of 0.5 hours the pressure reduced to less than 1.0 Torr and the temperature of the reactants increased to 250° C. These conditions were maintained for 2.5 hours, after which the reaction product, a carboxylic group-terminated sulfopolyester, was discharged hot from the reaction flask as a honey-like resin containing 46 mole percent of components having carbonyl groups on ortho-positioned carbon atoms (92 moles of o-dicarboxylic acid per 100 moles of all dicarboxylic acids). It had an inherent viscosity of 0.17 in dimethyl formamide; a glass transition temperature (Tg) of 50° C.; an $SO_3$— equivalent weight of 2500; a $CO_2$— equivalent weight of 12,000; 0.011 milliequivalents of hydrogen ion per gram; and a molecular weight, determined by a light scattering procedure, of about 20,000. No evidence of crystallinity was observed by differential scanning calorimetry analysis in samples annealed for 2 days at 100° C.

Substrates, e.g., aluminum sheeting, were dip coated with a 10% solution of the resin in water and dried. An adherent, mar resistant, tack-free coating was obtained that swelled in water but did not dissolve, but which was readily dissolved and removed by washing with any of methanol, ethyl acetate, and methylene dichloride.

EXAMPLE 2

An autoclave which could be pressurized was charged with 248.6 g (1.68 moles) phthalic anhydride, 85.8 g 5-sulfoisophthalic acid mono-sodium salt (0.32 mole), 248 g (40 moles) ethylene glycol, 1.0 g antimony trioxide, and 1.8 g sodium acetate (11.0 meq/mole). The autoclave was flushed with nitrogen, sealed, and heated to 240° C., the internal pressure rising to 2.8 Kg/cm$^2$ (40 psi), conditions which were held for 1.5 hours. At the end of this time, the pressure was released slowly over about one-half hour while removing water and excess glycol. The pressure was then reduced to less than 1.0 Torr and the temperature of the reactants increased to 250° C. and held for 2.5 hours. The product was then worked up as described in Example 1.

EXAMPLE 3

In accordance with the procedure of Example 1, an amorphous sulfopolyester was prepared using 21.4 g 5-sulfo-o-phthalic acid monosodium salt in place of the dimethyl 5-sodiosulfoisophthalate. The sulfopolyester obtained had an inherent viscosity of 0.19, a Tg of 43° C. and a molecular weight, by light scattering, of about 16,600. No evidence of crystallinity was observed by differential scanning calorimetry.

EXAMPLE 4

In accordance with the procedure of Example 1, an amorphous sulfopolyester was prepared using
159.1 g (0.82 mole) dimethyl phthalate
19.4 g (0.19 mole) dimethyl terephthalate
23.7 g (0.08 mole) dimethyl 5-sodiosulfoisophthalate
124.0 g (2.0 moles) ethylene glycol
0.05 g antimony trioxide
2.0 g sodium acetate (24 meq/mole).

The sulfopolyester obtained had an inherent viscosity of 0.23, a Tg of 51° C., and a molecular weight, by light scattering, of about 16,600. No evidence of crystallinity was observed by differential scanning calorimetry.

EXAMPLE 5

A sulfopolyester was prepared by the procedure described in Example 1 from
190.1 g (0.98 mole) dimethyl phthalate
5.9 g (0.02 mole) dimethyl 5-sodiosulfoisophthalate
124.0 g (2.0 moles) ethylene glycol
0.09 g antimony trioxide
0.21 g sodium acetate (2.5 meq/mole).

The sulfopolyester obtained was amorphous and soluble in water, methanol, and methylene chloride. Coatings of the sulfopolyester on glass, aluminum, and steel surfaces were prepared. These were adherent and mar resistant and were removed by wiping the coated substrate with cloth that had been dipped in aqueous methanol.

EXAMPLE 6

The procedure of Example 5 was repeated using 0.70 mole (135.9 g) instead of 0.98 mole of diemthyl phthalate and 0.3 mole (88.8 g) instead of 0.02 mole of dimethyl 5-sodiosuloisophthalate. The sulfopolyester obtained displayed amorphous and solubility characteristics similar to Example 1.

EXAMPLE 7

The procedure of Example 1 was repeated using
155.2 g (0.8 mole) dimethyl phthalate
10.0 g (0.1 mole) succinic anhydride
29.5 g (0.1 mole) dimethyl 5-sodiosuloisophthalate
124.0 g (2.0 moles) ethylene glycol
0.06 g antimony trioxide
1.6 g sodium acetate.

The sulfopolyester obtained showed no evidence of crystallinity.

EXAMPLE 8

Example 1 was repeated using
170.7 g (0.88 mole) dimethyl phthalate
35.5 g (0.12 mole) dimethyl 5-sulfoisophthalate
141.8 g (1.2 moles) 1,6-hexanediol
0.06 g antimony trioxide
0.7 g sodium acetate (8.5 meq)
0.7 g zinc acetate.

The sulfopolyester obtained showed no evidence of crystallinity. It had a molecular weight of 18,200, by light scattering, an inherent viscosity of 0.21, and a Tg of 15° C.

EXAMPLE 9

The procedure of Example 1 was repeated using
194.4 g (0.9 mole) 1,8-naphthalenedicarboxylic acid
26.7 g (0.1 mole) 5-sulfoisophthalic acid monosodium salt
124.0 g (2.0 moles) ethylene glycol
0.05 g antimony trioxide
0.7 g sodium acetate.

The sulfopolyester obtained showed no evidence of crystallinity. It had an inherent viscosity of 0.16 and a Tg of 73° C.

EXAMPLE 10

The procedure of Example 1 was repeated using, in place of 178.5 g of dimethyl phthalate, only 139.7 g (0.72 mole) of dimethyl phthalate and also 18 g (0.2 mole) of 3-hydroxypropionic acid. The sulfopolyester obtained showed no evidence of crystallinity. It had an inherent viscosity of 0.21 and a Tg of 28° C. Coatings on glass, aluminum, and steel surfaces were readily removed by water, methanol, and methylene chloride.

EXAMPLE 11

The procedure of Example 1 was repeated using the reactants
Phthalic anhydride: 106.6 g (0.72 mole)
Dimethyl isophthalate: 38.8 g (0.20 mole)
Dimethyl 5-sodiosulfoisophthalate: 23.7 g (0.08 mole)
Ethylene glycol: 124.0 g (2.00 moles)
Lithium acetate: 1.0 g
Zinc acetate: 0.03 g
Antimony trioxide: 0.05 g.

The sulfopolyester obtained showed no evidence of crystallinity. It had an inherent viscosity of 0.21 and a Tg of 43° C. and was soluble in water, ethanol, cyclohexanone, and 1,2-dichloroethane.

EXAMPLE 12

The procedure of Example 1 was repeated using the reactants:
Dimethyl phthalate: 139.7 g (0.72 mole)
Dimethyl isophthalate: 19.4 g (0.10 mole)
Dimethyl terephthalate: 19.4 g (0.10 mole)
Dimethyl 5-sodiosulfoisophthalate: 23.7 g (0.08 mole)
Ethylene glycol: 124.0 g (2.00 moles)
Sodium acetate: 2.0 g
Zinc acetate: 0.03 g
Antimony trioxide: 0.66 g.

EXAMPLE 13

The procedure of Example 1 was repeated using the reactants
Dimethyl phthalate: 170.7 g (0.88 mole)
Dimethyl 5-sodiosulfoisophthalate: 35.5 g (0.12 mole)
Ethylene glycol: 118.0 g (1.9 moles)
Polycaprolactone diol (approx 530 mw): 26.5 g
Sodium acetate: 0.7 g
Zinc acetate: 0.03 g
Antimony trioxide: 0.06 g.

The sulfopolyester obtained showed no evidence of crystallinity. It had an inherent viscosity of 0.23 and a

What is claimed is:

1. An amorphous sulfopolyester comprising the esterification product of at least one organic diol and at least one carboxylic acid wherein at least about 35 mole percent of said carboxylic acid is selected from the group consisting of ortho-acrylene and peri-arylene carboxylic acids, the arylene group thereof having from 6 to 14 carbon atoms, and wherein from about 1.0 to about 15.0 mole percent of the total moles of said diol and said carboxylic acid are sulfo groups.

2. The sulfopolyester of claim 1 having a weight average molecular weight of from about 8,000 to about 50,000.

3. An amorphous sulfopolyester having (a) repeating units of the formula:

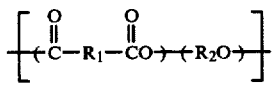

wherein $R_1$ is selected from the group consisting of $R_2$, $R_3$ and $R_4$, wherein $R_2$ is a divalent aliphatic group selected from a straight chain group; a branched chain group having from 2 to 10 carbon atoms; a ring group having from 4 to 6 carbon atoms; a ring group having from 3 to 6 carbon atoms and one oxygen atom; and a branched chain group having from 2 to 10 carbon atoms and one to 4 caternary oxygen atoms of which no two re attached together or to the same carbon atom, $R_3$ is selected from ortho-arylene and peri-arylene groups having from 6 to 14 carbon atoms, $R_4$ is selected from meta-arylene and para-arylene groups having from 6 to 14 carbon atoms; and (b) up to about 30 percent by weight of repeating units of the formula

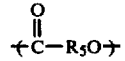

wherein $R^5$ is a divalent aliphatic groups selected from a straight chain group; a branched chain group having 2 to 10 carbon atoms; a ring group having from 4 to 6 carbon atoms; a ring group having from 3 to 6 carbon atoms and one oxygen atom; and a branched chain group having from 2 to 10 carbon atoms and one to 4 caternary oxygen atoms of which no two are attached together or to the same carbon atoms; and wherein at least about 35 mole percent of the total moles of $R_1$ and $R_5$ are $R_3$ and per 100 moles of combined $R_1$, $R_2$ and $R_5$ there are contained from about 1 to about 15 moles of attached —$SO_3M$ groups, wherein M is a cation.

4. The polyester of claim 3 having a weight average molecular weight of from about 8,000 to about 50,000.

5. An amorphous polyester of the formula

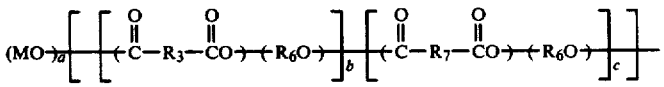

wherein $R_3$ is selected from ortho-arylene and peri-arylene groups of from 6 to 14 carbon atoms, $R_6$ is a straight chain alkylene group of from 2 to 6 carbon atoms, $R_7$ is a 5-sulfo-m-phenylene group, a is 0, 1 or 2, b is an integer from about 5 to about 15, the ratio of b to c is from about 10 to about 15 to 1, and M is an alkali metal.

* * * * *